United States Patent
Littman et al.

(10) Patent No.: US 8,691,385 B2
(45) Date of Patent: Apr. 8, 2014

(54) COATED AEROGEL BEADS

(75) Inventors: Howard Littman, Niskayuna, NY (US);
Joel L. Plawsky, Albany, NY (US);
John D. Paccione, Voorheesville, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 13/552,305

(22) Filed: Jul. 18, 2012

(65) Prior Publication Data

US 2012/0295115 A1 Nov. 22, 2012

Related U.S. Application Data

(62) Division of application No. 11/940,118, filed on Nov. 14, 2007, now Pat. No. 8,235,577.

(60) Provisional application No. 60/865,722, filed on Nov. 14, 2006.

(51) Int. Cl.
*B32B 5/16* (2006.01)

(52) U.S. Cl.
USPC .................. 428/407; 428/323; 428/327

(58) Field of Classification Search
None
See application file for complete search history.

(56) References Cited

U.S. PATENT DOCUMENTS

| | | | |
|---|---|---|---|
| 5,248,222 A | 9/1993 | Littman et al. | |
| 5,254,168 A | 10/1993 | Littman et al. | |
| 7,019,037 B2 * | 3/2006 | Zemanian et al. | 516/100 |
| 7,621,668 B2 | 11/2009 | Littman et al. | |
| 2006/0269734 A1 * | 11/2006 | Krajewski et al. | 428/304.4 |
| 2007/0205491 A1 * | 9/2007 | Tew | 257/632 |
| 2008/0105373 A1 * | 5/2008 | Ristic-Lehmann et al. | 156/286 |
| 2009/0082479 A1 * | 3/2009 | Cho | 521/141 |
| 2010/0080949 A1 * | 4/2010 | Ou et al. | 428/80 |

OTHER PUBLICATIONS

Park, K.-B., et al., "Mortar properties obtained by dry premixing of cementitious materials and sand in a spout-fluid bed mixer", Cement and Concrete Research, 2005.

* cited by examiner

*Primary Examiner* — Sheeba Ahmed
(74) *Attorney, Agent, or Firm* — Heslin Rothenberg Farley & Mesiti P.C.

(57) ABSTRACT

Methods and apparatus for coating particulate material are provided. The apparatus includes a vessel having a top and a bottom, a vertically extending conduit having an inlet in the vessel and an outlet outside of the vessel, a first fluid inlet in the bottom of the vessel for introducing a transfer fluid, a second fluid inlet in the bottom of the vessel for introducing a coating fluid, and a fluid outlet from the vessel. The method includes steps of agitating a material, contacting the material with a coating material, and drying the coating material to produce a coated material. The invention may be adapted to coat aerogel beads, among other materials. A coated aerogel bead and an aerogel-based insulation material are also disclosed.

10 Claims, 8 Drawing Sheets

COATED AEROGEL BEADS

CROSS-REFERENCE TO RELATED APPLICATIONS

This application is related to concurrently filed, commonly assigned application Ser. No. 13/552,298 and is a divisional of application Ser. No. 11/490,118 filed on Nov. 14, 2007, now U.S. Pat. No. 8,235,577, which claims priority from U.S. Provisional Patent Application Ser. No. 60/865,722, filed on Nov. 14, 2006, the disclosures of which are hereby incorporated by reference herein in their entirety.

The subject matter of the present application may also be related to the inventions described in application Ser. No. 11/567,100 filed on Dec. 5, 2006, now U.S. Pat. No. 7,621,668, and provisional application 60/868,468, filed on Dec. 4, 2006. The disclosures of these applications are also included by reference herein in their entirety.

STATE AND FEDERAL FUNDED RESEARCH

The invention described herein was made with New York State support under State Grant Number C010331 from the New York State Department of Transportation. The State of New York may have certain rights to this invention.

The invention described herein was also made with support of the National Aeronautics and Space Administration (NASA) under Federal Grant Number NNM05AA04A. The U.S. Government may have certain rights to this invention.

BACKGROUND OF THE INVENTION

1. Technical Field

This invention relates, generally, to systems, methods, and apparatus for coating particulate material and the coated particulate material so produced. More particularly, the present invention provides improved draft tube spout fluid bed (DTSFB) having the capability to coat particles with fluids, for example, for coating aerogel beads to provide a useful engineering material, for instance, an improved insulating material.

2. Description of Related Art

Coating particulate material can often enhance the physical and chemical properties of the material, for example, by reducing absorption of liquids and gases or simply protecting the particulate material from environmental degradation. For instance, the coating of particulate material can provide the following enhancements to particulate material: improved insulation properties, both thermal and electrical; improved abrasion resistance; and improved strength.

Aerogel beads were first developed in the 1930s and are the lightest solids known. Aerogels are low-density materials that have proven to be effective insulators. They typically have a thermal conductivity on the order of 0.01 Watts/meter-Kelvin, that is, less than one-third the thermal conductivity of polyurethane foam. However, only recently has the commercial scale production of aerogels been economically feasible. Aerogels are typically referred to by the nicknames "frozen smoke," "solid smoke," or "blue smoke."

Due to their insulating properties and their low density, approximately, 140 kilograms per cubic meter, aerogels have been proposed for insulation in a broad range of applications from insulating liquid natural gas (LNG) supertankers, to insulating superconductor power cables, to insulating spacecraft, such as, insulating the external fuel tanks or crew return vehicle of the space shuttle.

However, typically, untreated aerogels are porous and tend to absorb gases and liquids. For example, about 95% of the surface of aerogel beads contain pores having an average pore size of about 20 nanometers (nm). The absorption of fluids by aerogels may typically destroy the material or, at the very least, interfere with the insulating properties of the beads. The present inventors sought to overcome the porous nature of aerogels by coating aerogels to minimize or prevent the absorption or infiltration of fluids, for example, by applying a polymer coating. However, the very light, low-density nature of aerogels makes them difficult to handle, especially when attempting to coat these minute particles, typically, less than 5 millimeter (mm) in diameter. Aspects of the present invention overcome these technical difficulties, as well as overcoming the disadvantages and limitations of the prior art methods and apparatus.

One device that has been used to handle particulate material is a draft-tube, spout-fluid-bed (DTSFB) mixer. The design and operation of the DTSFB mixer were investigated by Littman, et al. and are disclosed in U.S. Pat. Nos. 5,248,222 and 5,254,168, both of Littman (one of the co-inventors of the present invention), et al. (the disclosures of which are included by reference herein). Recent developments of the DTSFB mixer were reported by Plawsky, et al. (2003), the disclosure of which is also incorporated by reference herein, in which a "first generation" mixer was disclosed. Further improvements in the DTSFB mixer were reported by Park, et al, (2006) in which a "second generation" DTSFB mixer was designed and tested. (The disclosure of Park, et al. (2006) is also included by reference herein.) Aspects of the present invention provide advantages over both Park, et al, (2006) and Plawsky, et al. (2003), and other prior art methods and apparatus.

SUMMARY OF THE INVENTION

Aspects of the present invention provide improved methods and apparatus for coating particulate material using different mechanics than the prior art coating systems. From an industrial point of view, aspects of the invention are easily scaled up from very small units to very large units in a very predictable manner. According to aspects of the invention, methods and apparatus are provided which produce coated particulate materials, for example, coated aerogels, that having improved insulation properties, both thermal and electrical; improved abrasion resistance; and improved strength compared to non-coated particulate materials. Aspects of the invention are based on two main components, namely, a pneumatic coating device and a collection device, such as, a vessel containing a bag filter, which is commonly used for air pollution control and solids recovery.

One aspect of the invention is a particulate material coating apparatus including a vessel having a top and a bottom, the vessel adapted to contain the particulate material; a vertically extending conduit (also known as a "draft tube") having an inlet in the vessel and an outlet outside of the vessel; a first fluid inlet in the bottom of the vessel, the first fluid inlet directed toward the inlet of the vertically extending conduit wherein a flow of a first fluid introduced by the first fluid inlet produces a flow of at least some of the particulate material and the first fluid through the vertically extending conduit; a second fluid inlet in the bottom of the vessel, the second fluid inlet adapted to introduce a second fluid to the flow of fluid introduced by the first fluid inlet, the second fluid adapted to coat at least some of the particulate material; and a fluid outlet from the vessel. The second fluid inlet is typically adapted to introduce the second fluid in the form of a spray, for example, the second fluid inlet may include an orifice, for instance, an orifice having a diameter of about 0.020 inches.

In one aspect, the apparatus may include means for regulating the flow of fluid from the fluid outlet from the vessel, for example, an automated valve, wherein at least one parameter of the flow of the particulate material and fluid though the vertically extending conduit is varied. The parameter varied may be particle flow velocity, fluid flow velocity, voidage, or a combination thereof, for example, for a given total fluid inlet flow.

Another aspect of the invention is a method for coating particulate material including introducing the particulate material to a vessel having a top and a bottom, a vertically extending conduit having an inlet in the vessel and an outlet outside of the vessel, a first fluid inlet in the bottom of the vessel directed toward the inlet of the vertically extending conduit, a second fluid inlet in the bottom of the vessel, and a fluid outlet; introducing a first fluid into the first fluid inlet to produce a flow of the first fluid that produces a flow of at least some of the particulate material and the first fluid through the vertically extending conduit; introducing a second fluid to the second fluid inlet whereby the second fluid is introduced into the flow of the first fluid; and coating at least some of the particulate material with the second fluid. In one aspect, the method further comprises regulating the flow of fluid from the outlet wherein at least one parameter of the flow of the particulate material and fluid though the vertically extending conduit is varied. The parameter may include particle flow velocity, fluid flow velocity, voidage, or combinations thereof, for example, for a given total fluid inlet flow. In one aspect, the particulate material comprises aerogel particles and coating comprises sealing at least some pores in the aerogel particles. The second fluid may comprise an alcohol, a water-based polymer, a solvent-based polymer, or a polyurethane. The second fluid may be air, nitrogen, an inert gas, or another suitable gas.

Another aspect of the invention is a method for coating aerogel beads including agitating a plurality of aerogel beads with a first fluid stream; contacting the agitated beads with a second fluid stream having at least one non-volatile component and at least one volatile component; evaporating at least some of the at least one volatile component contacting the beads wherein at least some of the non-volatile component adheres to a surface of the beads. In one aspect, the method may further comprise transporting the plurality of aerogel beads and the first fluid through a conduit. In another aspect, at least some of the evaporating is practiced during transport through the conduit.

A further aspect of the invention is a coated aerogel material comprising a plurality of aerogel beads at least partially coated with a polymer, for example, coated with a polyvinyl alcohol, a polymethyl methacrylate (PMMA), or a polyurethane, among other volatile materials. In one aspect, the aerogel beads comprise about 1 mm to about 5 mm aerogel beads, typically, about 1 mm to about 3 mm aerogel beads, for example, about 2 mm aerogel beads. Aspects of the present invention provide coated aerogel material having improved insulation properties, both thermal and electrical; improved abrasion resistance; and improved strength, among other things, compared to uncoated aerogel materials.

A still further aspect of the invention is an insulating material comprising a plurality of aerogel beads at least partially coated with a polymer, for example, coated with a polyvinyl alcohol, a polymethyl methacrylate, or a polyurethane, among other volatile materials. In one aspect, the aerogel beads comprise about 1 mm to about 5 mm aerogel beads, typically, about 1 mm to about 3 mm aerogel beads, for example, about 2 mm aerogel beads.

These and other aspects, features, and advantages of this invention will become apparent from the following detailed description of the various aspects of the invention taken in conjunction with the accompanying drawings.

BRIEF DESCRIPTION OF THE FIGURES

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF ASPECTS OF THE INVENTION

Aspects of the present invention may be utilized to coat particulate material in a broad range of applications. For example, aspects of the invention may be used for, but are not limited to, coating particulates, for example, coating any particulate material that is recognizable by those of skill in the art, for example, pharmaceuticals; food stuffs; cosmetics; metals, such as, powder manufacturing powder metals; ceramics; and like particulates. Though the following description of aspects of the invention may refer to the use of aspects of the invention in coating aerogel beads, aspects of the present invention are not limited to handling and treating aerogel beads. It will be understood that one or more other particulate materials may also be handled and treated according to aspects of the invention in similar fashions.

Figure 1:
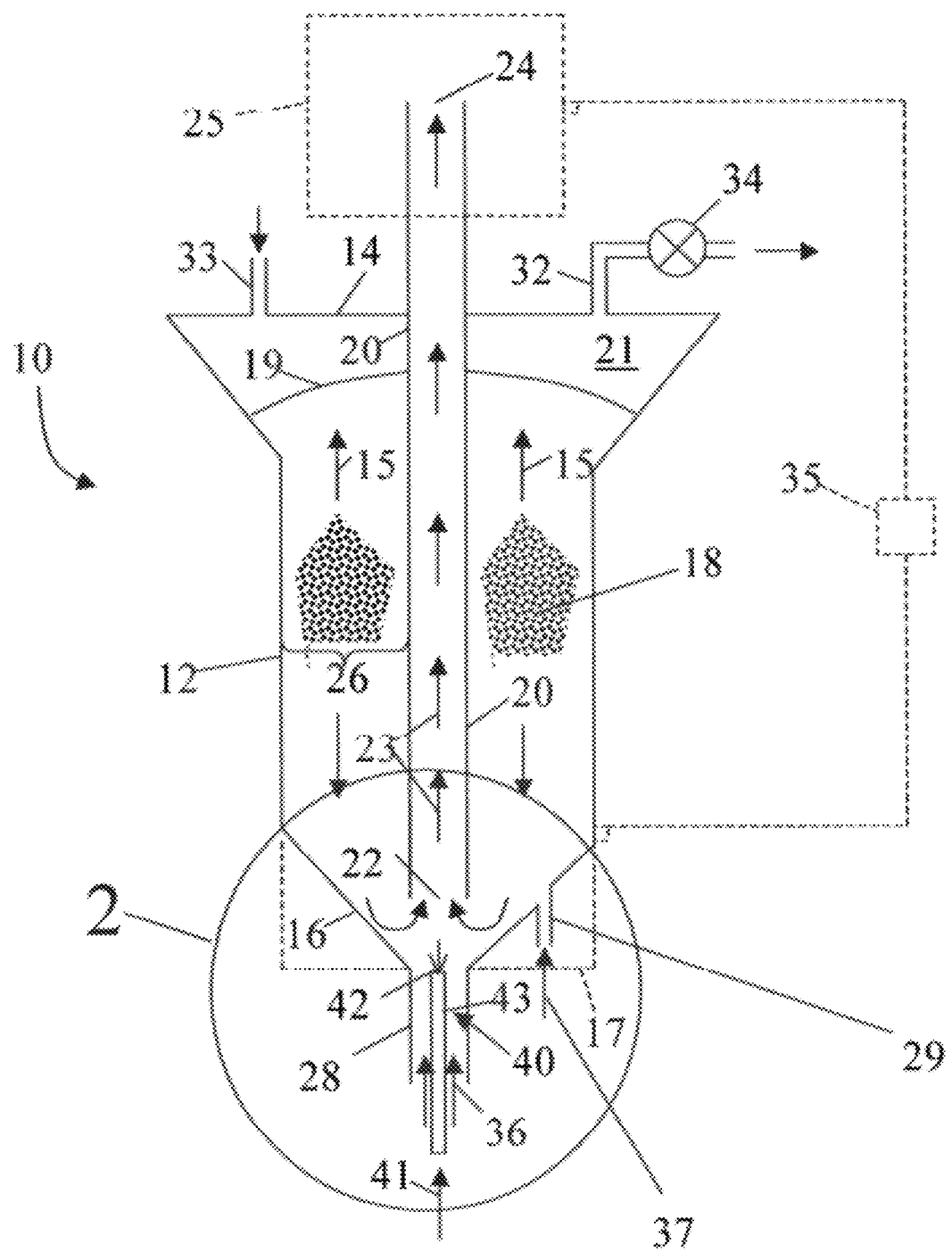
FIG. 1 is a schematic diagram, in cross-section, of a particulate material coating apparatus according to one aspect of the invention.

FIG. 1 is a schematic diagram, in cross-section, of a particulate material coating apparatus 10 according to one aspect of the invention. Apparatus 10 includes a vessel 12, for example, a circular cylindrical vessel, though any non-circular or non-cylindrical vessel may be used, as appropriate. Vessel 12 includes a substantially closed top 14 and a substantially closed bottom 16 and, according to aspects of the invention, contains particulate material 18. Though closed bottom 16 is illustrated as having a conical, upwardly expanding geometry in FIG. 1, it will be understood that bottom 16 may comprise any conventional vessel shape, including a circular or rectangular cylindrical bottom 17 as shown in phantom in FIG. 1. Particulate material 18 may include any particulate material, for example, a powder, pellets, beads, chips, chunks, and the like, which may be metallic or non-metallic, for example, sand, stone, plastics, polymers, pharmaceuticals, saw dust, wood chips, food particles, ceramics, porous material, catalysts, catalytic materials, absorbents, adsorbents, ion exchange resins, and the like. In one aspect, particulate material 18 may comprise aerogel beads, for example, beads of a low-density solid-state material derived from gel in which the liquid component of the gel has been replaced with gas. The aerogel beads may comprise aerogel materials based on silica, alumina, chromia, tin oxide, or carbon, among other materials. The aerogel beads may have diameters ranging from about 50 micrometers [μm] to about 5 millimeters [mm].

In one aspect, particulate material 18 may comprise a plurality of particulate materials, for examples, materials intended to be mixed by apparatus 10, for instance, sand and cement or two or more pharmaceuticals. In one aspect, particulate material 18 may comprise a material having sufficient voidage, that is, space between particles, that when placed in vessel 12 a fluid, for example, a gas or liquid, may be passed through particulate material 18, for example, in a direction indicated by arrows 15. Particulate material 18 may form a level of material 19, below top 14 of vessel 12 whereby a void space 21 is provided in top 14 of vessel 12, for example, an annular void space. Void space 21 may provide a plenum into which fluid passes after passing through material 18 prior to, for example, exiting vessel 12.

According to aspects of the invention, vessel 12 of apparatus 10 includes at least one conduit, pipe, or tube 20 (which may be referred to in the art as a "draft tube") having an open first end 22 positioned inside vessel 12 and an open second end 24 positioned outside or inside of vessel 12. Conduit 20 may typically be directed vertically within vessel 12, as shown in FIG. 1; however, conduit 20 may be oriented at any angle, that is, an angle from the vertical, while effecting the desired function described in this specification and attached claims. Optionally, the open second end 24 of conduit 20 may be located in a second vessel 25 (shown in phantom in FIG. 1). A typical second vessel 25 that may be used in aspects of the invention is described and discussed with respect to FIG. 3 below, though any vessel which is adapted to collect particulate material discharged from open second end 24 may be used. Conduit 20 may have any convenient cross-section, for example, circular, oval, or rectangular, but is typically circular in cross section. In one aspect, conduit 20 may be directed substantially vertically in vessel 12 whereby conduit 20 forms an annular region 26 in vessel 12 between the outside of conduit 20 and the inside of vessel 12.

Vessel 12 includes at least one fluid inlet 28 positioned in the bottom 16 of vessel 12 for receiving a fluid 36 (that is, a liquid or gas) and at least one fluid outlet 32 positioned in top 14 of vessel 12. Fluid 36 may be a multiphase fluid, for example, a fluid containing a liquid and solids, a fluid containing a liquid and a gas, a fluid containing a gas and solids, or a fluid containing a liquid, a gas, and solids. It will be understood by those in the art, that the multiphase fluid may contain one or more liquids, one or more gases, or one or more different solids depending upon the treatment to be performed in vessel 12. Vessel 12 may also include at least one inlet 33, for example, positioned in top 14, for instance, for introducing particulate material 18 to vessel 12. Inlet, or fluid jet, 28 comprises a conduit having a fluid outlet 30 (see FIG. 2) directed toward inlet 22 of conduit 20. According to aspects of the invention, inlet 28 is so positioned whereby fluid introduced to inlet 28 and directed toward inlet 22 of conduit 20 produces a flow of at least some of particulate material 18 and fluid through the conduit 20, as indicated by arrows 23. Due to the typical expansion of fluid flow as the fluid leaves inlet 28, the diameter of inlet 28 may be smaller than the diameter of inlet 22. Also, the spacing of inlet 28 from inlet 22 may be varied, for example, the elevation of inlet 28 may be varied, for instance, depending upon the nature of the fluid introduced and the particulate material 18. In some aspects of the invention, the flow of fluid through inlet 28 may be augmented by one or more additional fluid inlets 29 for introducing a fluid 37, for example, the same or different fluid 36 introduced to inlet 28.

According to aspects of the invention, vessel 12 includes a means or mechanism 40 for introducing a coating fluid 41 to vessel 12. For example, as shown in FIG. 1, mechanism 40 may be one or more spray nozzles 43 adapted to introduce fluid 41 to contact and coat at least some of the particulate material 18, for example, as material 18 is being transported through conduit 20. Spray nozzles 43 may be any fluid injection device adapted to expose material 18 to fluid 41, for example, spray nozzles 43 may introduce a fine mist of liquid, a flow of liquid in a gas, or a flow of gas. In one aspect, mechanism 40 may comprise one or more spray nozzles provided by Spraying Systems Company of Wheaton, Ill., for example, a spraying system having an SU2A air atomizing spray nozzle set up with a fluid cap 2050 and air cap 70, having a nozzle diameter of about 0.020 inches, though other spraying nozzle systems may be used. Coating fluid 41 may comprise any fluid adapted to coat material 18 being handled, and coating fluid 41 may vary depending upon the nature of material 18 being coated. In one aspect, where material 18 comprises aerogel beads, coating fluid 41 may comprise a polyvinyl alcohol, for example, an OPADRY water-based cationic polymer provided by Colorcon; a polymethyl methacrylate, for example, a water-based anionic polymer, a solvent based cationic polymer or a solvent-based neutral polymer marketed under the trademark EUDRAGIT by Degussa; or a urethane, for example, a polyurethane solution or a waterborne polyurethane solution, among others.

According to aspects of the invention, the outlet 32 may include some means 34 for regulating or controlling the flow of fluid through outlet 32. Outlet 32 may be a conduit and means 34 may be a valve, for example, a ball, a needle, a globe, or gate valve. In aspects of the invention, means 34 controls the flow of fluid from outlet 32 whereby at least one parameter of the flow of particulate material 18 and fluid though the conduit 20 is varied. For example, varying the flow through outlet 32 may vary particle flow velocity, fluid flow velocity, voidage, or a combination of two or more of these parameters. In one aspect of the invention, vessel 12 may include at least one means 35 for controlling the pressure drop across conduit 20. For example, means 35 may comprise a dp cell or a differential pressure indicator having high and low pressure taps appropriately positioned in vessel 12 and/or vessel 25. Contrary to prior art devices, for example, the device disclosed by Plawsky, et al. (2003), by controlling or regulating the pressure drop across conduit 20, aspects of the present invention permit the operator to regulate or control the flow of the particulate material through conduit 20, for example, to control the flow regime in conduit 20 or control the solids fraction of the particulate material flowing through conduit 20. In FIG. 1, means 35 is illustrated schematically for reference only; however, in aspects of the invention, a pressure drop across conduit 20 may be controlled by mean of a restriction in conduit 20 or a restriction down stream of conduit 20, for example, a restriction in optional vessel 25 or a restriction in a conduit leading from vessel 25, such as, a valve. The controlling of the pressure drop across conduit 20 may be practiced by controlling or regulating the pressure in vessel 12, by controlling or regulating the pressure in optional vessel 25, or both.

Figure 2:
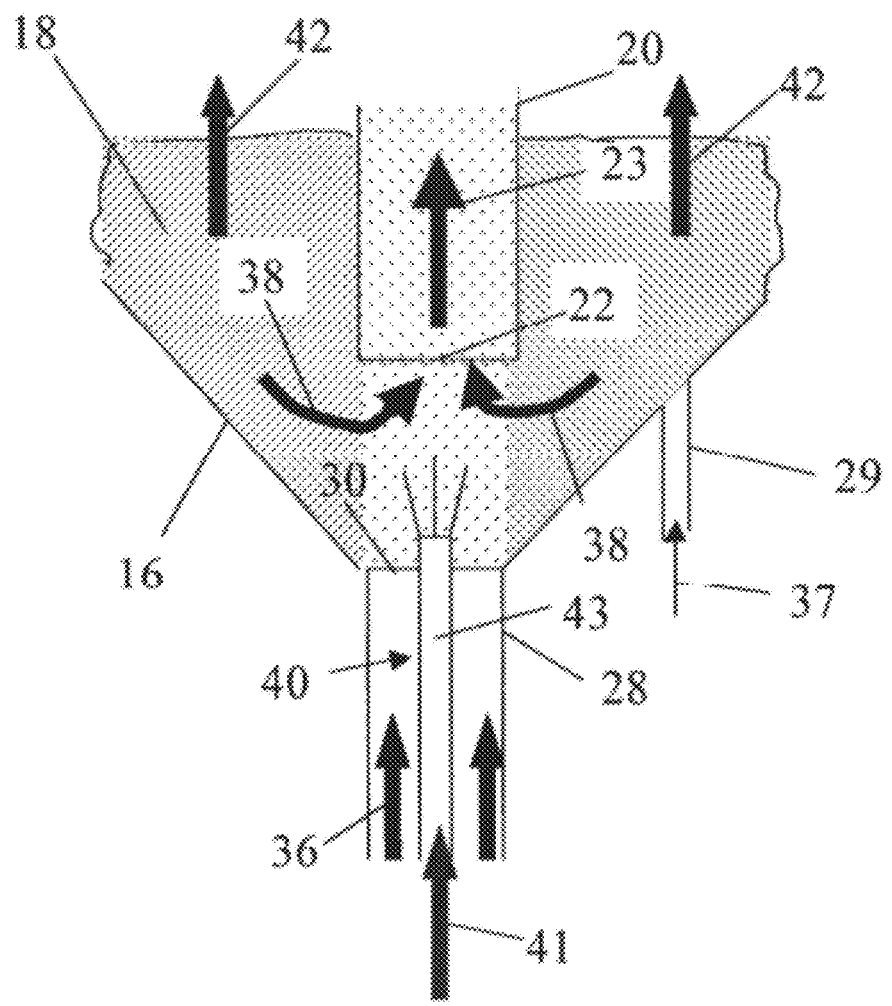
FIG. 2 is a detailed schematic diagram of the lower section of the apparatus shown in FIG. 1 as identified by detail 2 in FIG. 1.

FIG. 2 is a detailed schematic diagram of the lower section of the apparatus 10 shown in FIG. 1 as identified by Detail 2 in FIG. 1. According to aspects of the invention, as a fluid, for example, a gas or a liquid, is introduced to vessel 12 through inlet 28, as indicated by arrows 36, the fluid enters vessel 12 and entrains and/or agitates at least some of particulate material 18 into open end 22 of conduit 20, as indicated by arrows 38, and transfers particulate material 18 through conduit 20, as indicated by arrow 23. As described in, for example, U.S. Pat. No. 5,248,222, the introduction of a pressurized fluid, typically, air (though other gases or liquids may be used), into inlet 28 (and/or other inlets 29) agitates and/or entrains the particulate material 18 above inlet 28 whereby particulate material 18 will flow like a fluid. In one aspect of the invention, this agitation and/or aeration of particulate material is often referred to as "fluidization," whereby a normally solid particulate material 18 is induced to behave somewhat like a fluid under the influence of the fluid introduced to inlet 28 and, possibly, inlets 29. The fluidization of the particulate material and the consequent creation of a pressure differential between the open end 22 and open end 24 of conduit 20 promotes the flow of the aerated particulate material 18 from open end 22, through conduit 20, and out of open end 24.

According to aspects of the invention, while material 18 is entrained, agitated, and/or fluidized by fluid introduced by inlet 28, at least one further fluid 41 is introduced by means 40, for example, one or more nozzles 43, to contact the material 18 with fluid 41. In one aspect, fluid 41 comprises a fluid adapted to at least coat at least some of the surface of the individual particles of material 18. In one aspect, at least 25% of the surface of particulate material 18 is receives at least some fluid 41. In another aspect of the invention, at least 50% or even at least 75%, of the surface area of the material receives at least some fluid 41. In some aspects more than 90% or even substantially 100% of the surface area of material 18 may be covered or coated with fluid 41.

During or after coating material 18 with fluid 41, the fluid 41 is allowed to "dry" onto the surface of material 18, for example, by evaporation of any volatile components present in fluid 41, whereby at least some non-volatile component of fluid 41 adheres to at least some of the surface of particulate material 18, to provide a coated particular material 18. In one aspect, at least some of the surface of particulate material 18, for example, at least 25% of the surface, is coated with a non-volatile component of fluid 41. In another aspect of the invention, at least 50% or even at least 75%, of the surface area of the material is coated with a non-volatile component of fluid 41. In some aspects, more than 90% or even substantially 100% of the surface area of material 18 may be covered or coated with a non-volatile component of fluid 41. According to aspects of the invention, this drying or evaporation of volatile components may be accelerated by the fluid flow introduced via inlet 28. For example, the fluid introduced via inlet 28 may comprise a fluid having little or no concentration of the volatile component of fluid 41, for example, fluid 41 may be a low humidity air or low humidity nitrogen, among other gases. In another aspect, the fluid introduced to inlet 28 may be heated, for example, heated air, to enhance evaporation of the volatile components of fluid 41.

In some aspects of the invention, at least some of the fluid introduced through inlets 28 and 29 may also pass through particulate material 18 in annulus 26, as indicated by arrows 42, and exit vessel 12 through outlet 32. Thus, according to aspects of the invention, apparatus 10 may comprise an apparatus for handling or transporting particulate material 18 through conduit 20; an apparatus for treating particulate material 18 with a fluid 36, that is, for treating particulate material 18 in conduit 20, in annulus 26, or a combination thereof; an apparatus for mixing one or more particulate materials; or a combination thereof. However, unlike prior art apparatus, in apparatus 10 according to aspects of the present invention, the nature of the flow of material in conduit 20 and annulus 26 may be moderated and controlled, for example, by manipulating the pressure drop across conduit 20, for instance, by manipulating valve 34 in outlet 32. As noted above, the pressure drop across conduit 20 may be varied in numerous ways according to the invention, for example, by introducing a restriction to conduit 20; by introducing a restriction to a down stream flow, for example, by means of a pressure control element, such as, a valve; or by providing a vessel 25 downstream of conduit 20, for example, a vessel in which pressure is regulated. In one aspect of the invention, the concentration of the solid particles 18 transferred through conduit 20 may be regulated and/or controlled by regulating and/or controlling the pressure drop across conduit 20, for example, by manipulating a valve in an outlet from a downstream vessel.

Apparatus 10 shown in FIGS. 1 and 2, with or without means 35 for controlling the pressure drop across conduit 20, may be used to handle, coat, treat, and/or react particulate material 18 or for handling, treating, or reacting fluid 36. For example, apparatus 10 may comprise a mixing apparatus for mixing two or more materials. Apparatus 10 may also comprise a treatment apparatus, for example, an apparatus for treating the fluid introduced to inlet 28 with the particulate material 18. Apparatus 10 shown in FIGS. 1 and 2, with or without means 35 for controlling the pressure drop across conduit 20, may be used to execute a chemical or physical reaction, for example, a reaction that particulate material 18 may or may not take part in, for example, may or may not catalyze, using at least part of the fluid streams 36 entering through inlet 28 (or auxiliary inlets 29). A chemical or physical reaction may take place in the annular region 26, or in conduit 20, or both in region 26 and in conduit 20. A reaction may also take place in down stream vessel 25. Particulate material 18 may return at least in part through inlet 33 after residence in vessel 25, for example, where a physical or chemical reaction may have taken place prior to return through inlet 33, though substantially all of the material 18 passed to vessel 25 may be returned to vessel 12. Typical chemical or physical reactions that may be practiced in vessel 12 may include, but are not limited to, catalytic oil cracking, protein separations, particle mixing, and particle coating, among others.

According to aspects of the invention, particulate material 18 may comprise one or more particulate materials, such as sand and cement, that when aerated, coated, and transported through conduit 20 are at least partially mixed or agitated to provide a mixture of coated particulate material discharged from open end 24 of conduit 20. For example, during transport through conduit 20, the inventors surmise that the turbulent eddies generated in conduit 20 provide shearing forces that overcome particle surface effects, such as van der Waals forces and electrostatic forces that hold individual particles in clumps, to break up clusters and clumps of particulate material and provide a more uniformly mixed material. In another aspect of the invention, as discussed above, apparatus 10 may comprise a coating apparatus by which one or more particulate materials 18 may be coated with a material contained in fluid 41 introduced to means 40, for example, a nozzle 43, before or during transport through conduit 20.

Figure 3:
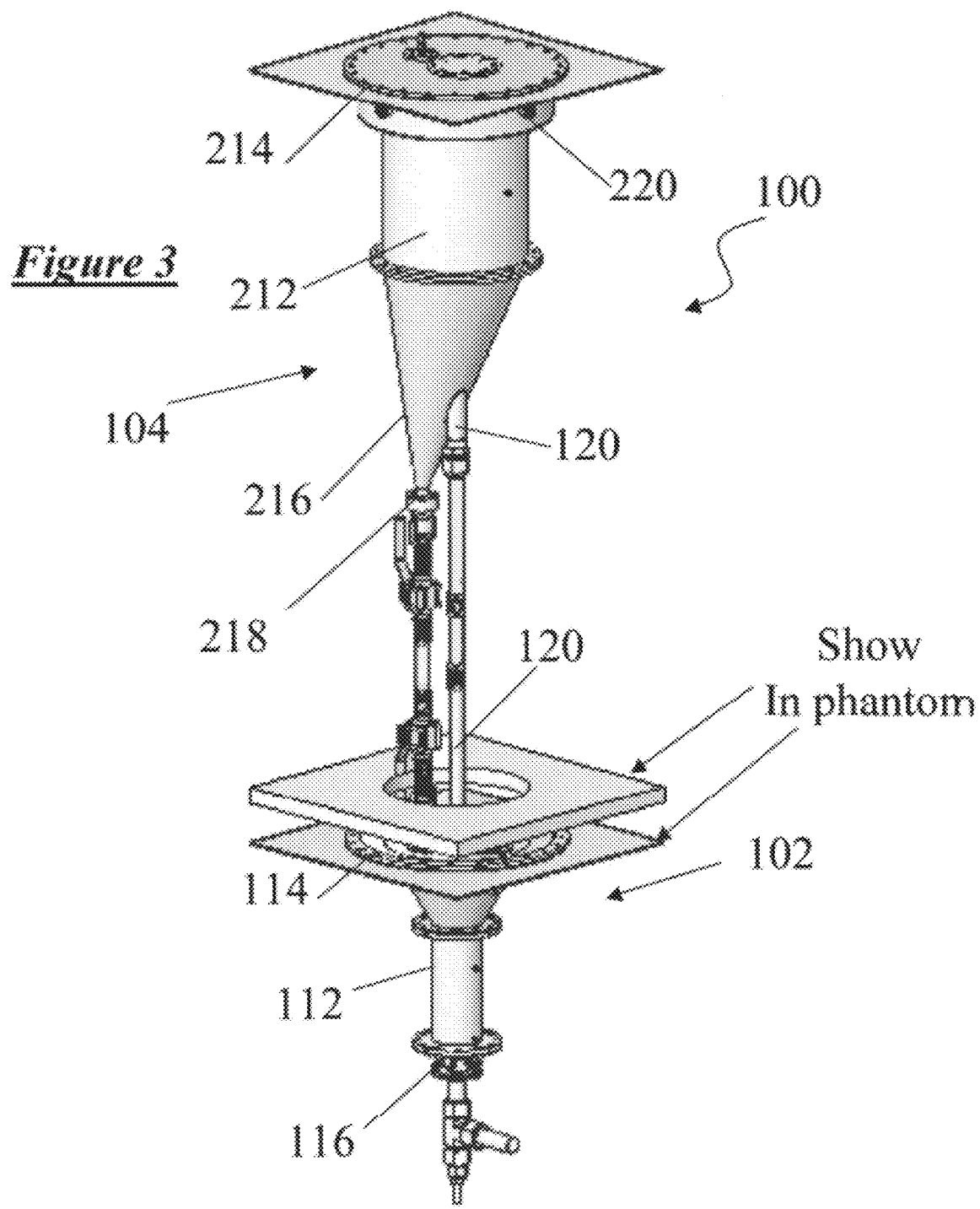
FIG. 3 is a perspective view of a particulate material coating apparatus according to another aspect of the invention.
Figure 4:
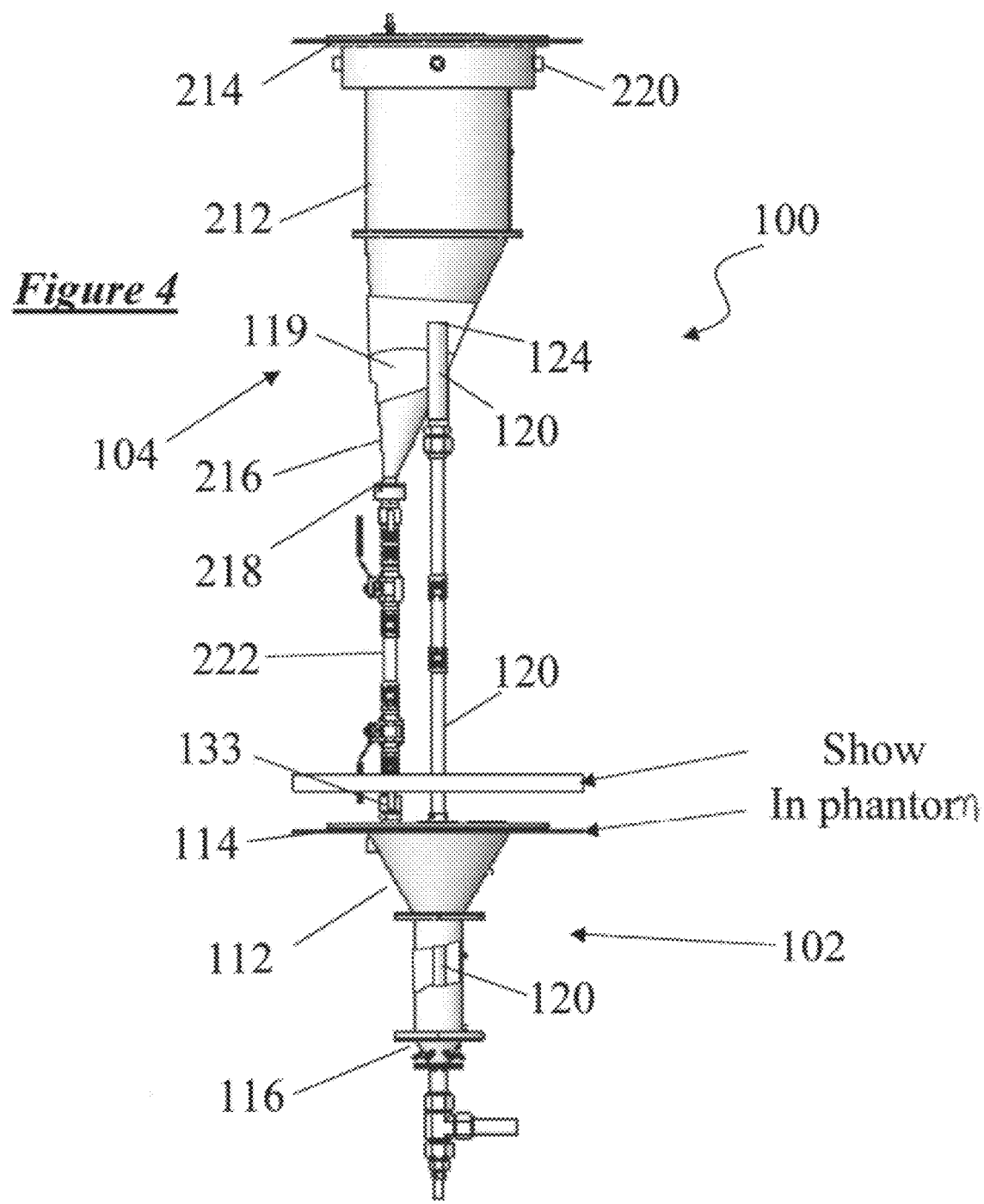
FIG. 4 is a front elevation view of the apparatus shown in FIG. 3.
Figure 5:
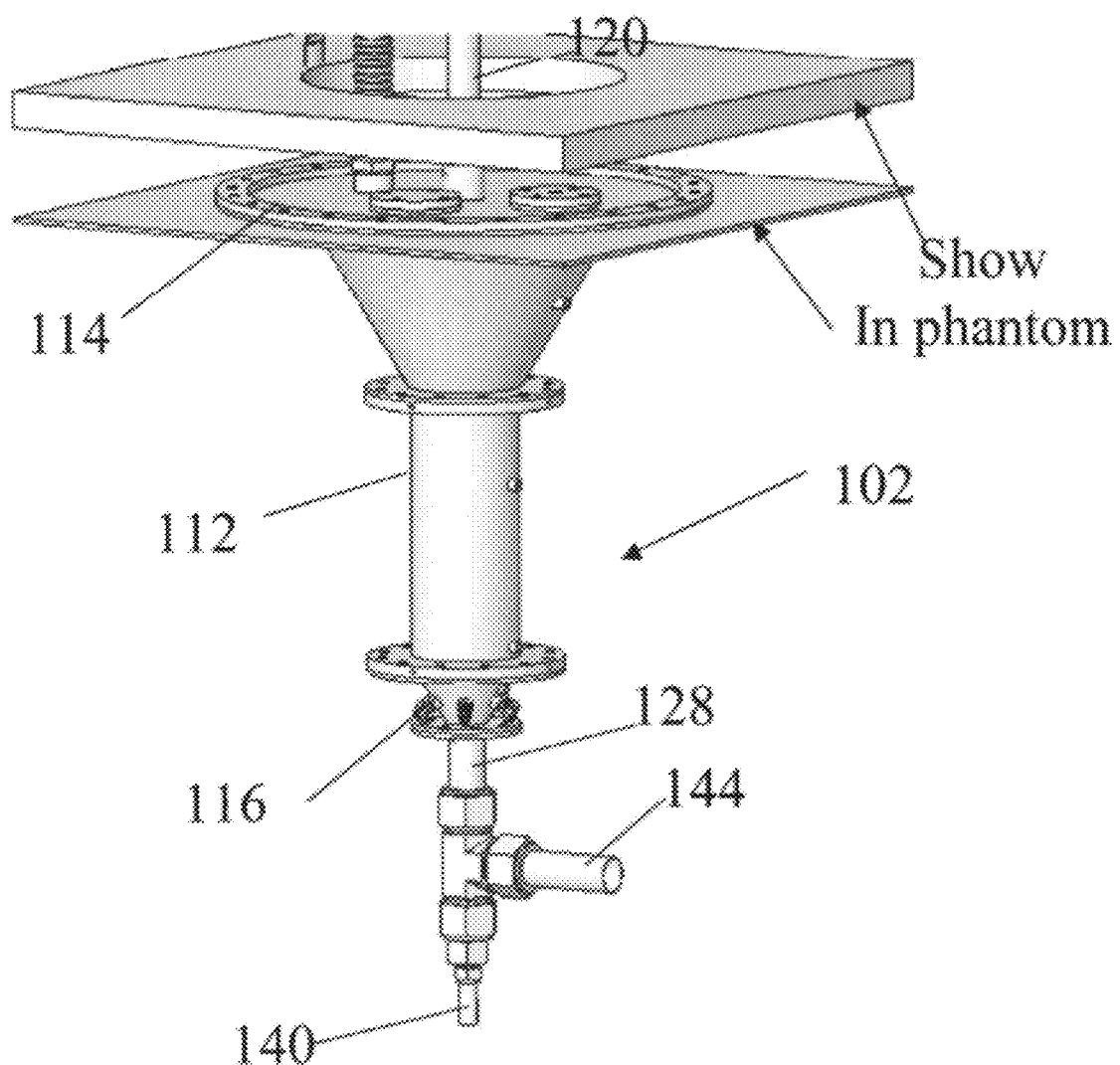
FIG. 5 is a perspective view of the feeding and treating apparatus shown in FIG. 3.
Figure 6:
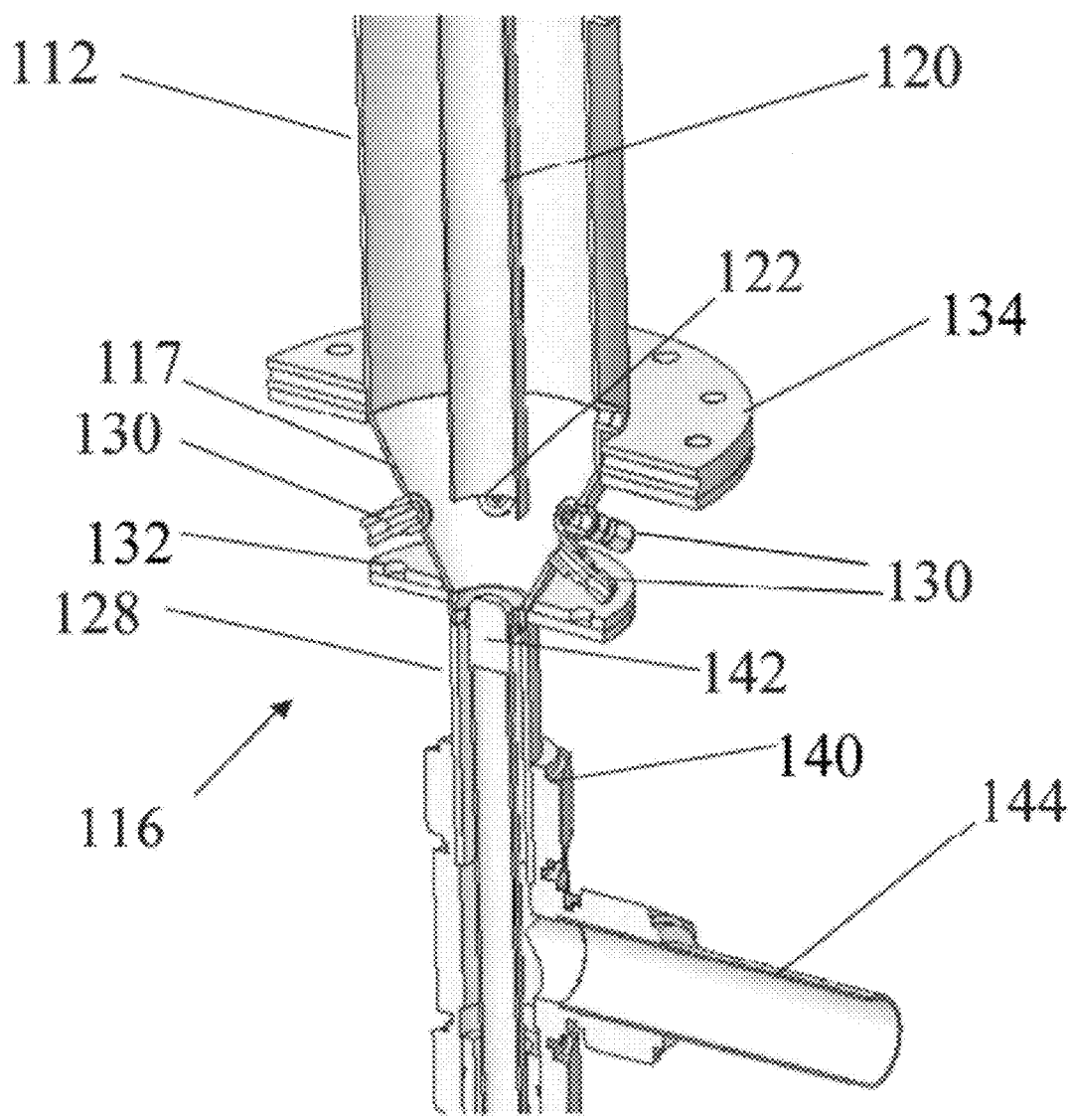
FIG. 6 is a perspective, in cross section, of the inlet of the feeding and treating apparatus shown in FIG. 5.

FIG. 3 is a perspective view of a particulate material coating apparatus 100 according to another aspect of the invention. FIG. 4 is a front elevation view of apparatus 100 shown in FIG. 3. Apparatus 100 includes a feeding and treating apparatus 102 and a drying and collecting apparatus 104. Similar to apparatus 10 shown in FIGS. 1 and 2, in one aspect of the invention, feeding and treating apparatus 102 conveys particulate material while coating the material conveyed, for example, aerogel beads. Apparatus 102 includes a vessel 112, for example, a circular cylindrical vessel, having a substantially closed top 114 and a substantially closed bottom 116 and, according to aspects of the invention, contains particulate material 118 (not shown). Particulate material 118 may include any particulate material, for example, particulate materials that may comprise particulate material 18 described above. In one aspect, particulate material 118 may comprise aerogel beads. Apparatus 102 includes a plurality of inlet conduits in bottom 116 and at least one outlet conduit 120, for example, a "draft tube," in top 114. Further details of apparatus 102 are illustrated and described with respect to FIG. 5, which illustrates a detailed perspective view of apparatus 102.

As shown in FIG. 4, drying and collecting apparatus 104 is mounted above apparatus 102 and is adapted to receive particulate material 118 fed by apparatus 102 through conduit 120. Apparatus 104 also includes a vessel 212, for example, a circular cylindrical vessel, having a substantially closed top 214 and a substantially closed bottom 216 and, according to aspects of the invention, contains particulate material 119 transferred from apparatus 102, for example, coated particulate material 118. Apparatus 104 includes at least one inlet in communication with the at least one outlet conduit 120 from apparatus 102 and at least one outlet conduit 220 in top 214. Though closed bottom 216 may comprise any conventional vessel geometry, in the aspect of the invention shown in FIGS. 3 and 4, bottom 216 comprises an eccentric conical bottom, for example, offset to avoid interference with conduit 120. Bottom 216 may include one or more outlets 218 for discharging treated particulate material 119, for example, to storage or further treatment. Outlet 218 may be in direct communication with one or more inlets 133 into apparatus 102, for example, via one or more conduits 222, whereby treated particulate material 119 may be re-introduced to apparatus 102 for further treatment, for example, for further coating. Conduit 222 may include one or more flow control or flow isolation devices.

FIG. 5 is a detailed perspective view of the feeding and treating apparatus 102 shown in FIGS. 3 and 4 and FIG. 6 is a cross-sectional view of the detailed perspective view of bottom 116 of apparatus 102 shown in FIG. 5. As shown, bottom 116 comprises a conical divergent transition 117 having divergent side walls, an inlet 128, mounted by flange 132, directed to the apex of conical transition 117, and a plurality of inlets 130 directed into the divergent sidewalls of transition 117. Conical transition 117 surrounds an open end 122 of conduit 120, that is, a "draft tube," and is mounted to vessel 112 by means of flange 134. According to aspects of the invention, bottom 116 also includes a nozzle 140 having an orificed end 142 adapted to direct a fluid stream toward the open end 122 of conduit 120. For example, nozzle 142 may be provided by model F24-SU2A nozzle provided by Spraying Systems Company. Typically, nozzle 140 may be centrally located within inlet 128, for example, mounted by two or more equally-spaced supports positioned about the inside diameter of inlet 128 and, possibly, along the length of inlet 128.

In a manner similar to that described with respect to FIG. 2 above, according to aspects of the invention, as a fluid, for example, a gas or a liquid, is introduced to inlet 128, the fluid enters vessel 112 and entrains at least some particulate material 118 (not shown) into open end 122 of conduit 120 and transfers particulate material 118 through conduit 120. The entrainment and/or transfer of the particulate material 118 may be supplemented or augmented by introducing one or more fluids via inlets 130. As noted above, the fluidization of the particulate material 118 and the consequent creation of a pressure differential between the open end 122 of conduit 120 and the distal open end 124 of conduit 120 promotes the flow of the aerated particulate material 118 from open end 122, through conduit 120, and out of open end 124 in apparatus 104.

Again, as discussed above, according to aspects of the invention, while material 118 is agitated, aerated, or fluidized by fluid introduced by inlet 128 and/or inlets 130, at least one further fluid is introduced by means of nozzle 140 to contact the dispersed material 118 with fluid. In one aspect, the fluid introduced via nozzle 140 may comprise a fluid having a non-volatile component which is adapted to at least partially coat the individual particles of material 118. In one aspect, at least some of the surface of particulate material 118, for example, at least 25% of the surface, is coated with a least some of the non-volatile component of the fluid. In another aspect of the invention, at least 50% or even at least 75%, of the surface area of particulate material 118 receives at least some of the non-volatile component of the fluid. In some aspects more than 90% or even substantially 100% of the surface area of material 118 may be covered or coated.

During or after coating material 118 with the fluid, the fluid is allowed to "dry" onto the surface of material 118, for example, by evaporation of any volatile components present in the fluid, whereby at least one non-volatile component of the fluid adheres to the surface of particulate material 118, to provide a coated particular material 119. According to aspects of the invention, this drying or evaporation of volatile components may be accelerated by the fluid flow introduced via inlet 128. For example, the fluid introduced via inlet 128 may comprise a fluid having a little or no concentration of the volatile component of the fluid introduced to nozzle 140. In another aspect, the fluid introduced to inlet 128 may be heated, for example, heated air, to enhance evaporation of the volatile components of the fluid introduced through nozzle 140. In another aspect of the invention, drying or evaporation may be promoted by heating the vessel 112, for example, heating the bottom 116 and/or the transition 117. The heating of vessel 112 may practiced with an internal or external heating device, for example, a heat exchanger mounted about vessel 112 with appropriate insulation.

With the aid of the illustrations of the aspects of the invention found in FIGS. 1 through 6, the following discussion will illustrate and underscore the advantages of aspects of the present invention compared to the prior art. The present invention, which may be referred to in the art as a type of draft-tube-spout, fluid-bed (DTSFB) apparatus, provides improvements over prior art DTSFB apparatus. For example, as discussed above, according to aspects of the present invention, a DTSFB apparatus is provided in which the feeder section, that is, apparatus 102 in FIGS. 3 and 4, is separated from the separator section, that is, apparatus 104 in FIGS. 3 and 4. This arrangement allows the fluid flow rate in the draft tube, for example, tube 120 in FIGS. 3 and 4, and the pressure drop across the draft tube to be independently specified. As a result, either the solids fraction flowing through the draft tube, the particle velocity flowing through the draft tube, or both of these parameters can be set and varied, for example, independently set and varied.

The inventors have established that the particle mass flux through a draft tube, $W_d$, can be defined as a function of solids fraction flowing through draft tube, $(1-\epsilon_d)$; the particle density, $\rho_p$; and the particle velocity, $v_d$, by the relationship in Equation 1.

$$W_d = (1-\epsilon_d)\rho_p v_d \quad [\text{Equation 1}]$$

According to aspects of the invention, as a result of the relationship defined by Equation 1, the processing time of the particles (that is, the transit time of the particles in the draft tube as defined by particle velocity, $v_d$) and the environment in which the particles are processed (that is, the solids fraction of the particles in the draft tube) can both be varied independently. This versatility contrasts with prior art DTSFB apparatus in which only one of these parameters (that is, particle velocity time or solids fraction) can be specified independently.

This limitation of the prior art is associated with the typical inability of prior art DTSFB mixers to differentiate the pressure drop across the draft tube (for example, the dynamic pressure difference from the inlet 22 to the outlet 24 of draft tube 20 in FIG. 1) from the pressure drop across the annular bed (for example, the pressure difference from the bottom of the annular bed 26 from the bottom of vessel 12 to the void space 21 at the top of the particulate material 18 in FIG. 1). For example, a typical prior art DTSFB apparatus is illustrated in FIG. 1 of Plawky, et al. (2003), in which the outlet of the draft tube and the top of the DTSFB vessel are in fluid communication, that is, are at relatively the same pressure. In contrast, according to aspects of the present invention, these pressure drops can be different and varied independently. This advantage of aspect of the present invention will be elaborated up further below.

The pressure drop across the annulus of a DTSFB apparatus, that is, in both prior art apparatus and aspects of the present invention, may be determined as a function of the flows to the inlet of the DTSFB apparatus. Once these flow rates are defined, the rate of fluid flow, for example, the rate of mass fluid flow, through the draft tube is determined by a material balance of the flows into and out of the inlet of the DTSFB apparatus, for example, as illustrate by the flows shown in FIG. 2. The material balance about vessel 12 (see FIG. 1) is defined by Equation 2:

$$F_d = F_{jo} + F_{axo} + F_s - F_a. \quad [\text{Equation 2}]$$

Where, in Equation 2, $F_d$ = the mass fluid flow rate in the draft tube, arrow 23 in FIG. 2;

$F_{jo}$ = the mass fluid flow rate through the inlet nozzle, arrows 36 in FIG. 2;

$F_{axo}$ the mass fluid flow rate through the auxiliary nozzles, arrow 37 in FIG. 2;

$F_s$ = the mass fluid flow rate through the spray nozzle, for example, the coating fluid, arrow 41 in FIG. 2; and $F_a$ = the mass fluid flow rate through the annulus, arrows 42 in FIG. 2.

Again, once the draft tube flow rate, $F_d$, and the solids fraction, $(1-\epsilon_d)$, are established, the pressure drop across the draft tube, $\Delta P_d$, may be defined. By varying any one of the flow rates in Equation 2, the pressure drop across the draft tube, $\Delta P_d$, may be varied. As noted above, typically, in prior art DTSFB apparatus the pressure drop across the draft tube must be substantially the same as the pressure drop across the annular bed. However, according to aspects of the present invention, the pressure drop across the draft tube may vary from the pressure drop across the annular bed.

According to other aspects of the invention, the fluid velocity and the particle velocity or their difference in the draft tube are a function of the drag force on the particles. That is, once the fluid velocity is known, the particle velocity may also be known. Moreover, in aspects of the invention, changes in the particle velocity may be effected by varying the inlet flow conditions, for example, by varying the mass fluid flow rate through the inlet nozzle, $F_{jo}$; varying the mass fluid flow rate through the auxiliary nozzles, $F_{axo}$; and/or varying the mass fluid flow rate through the annulus, $F_a$. According to aspects of the invention, once the particle velocity is fixed or known, the solids fraction, $(1-\epsilon_d)$, can be varied by varying the pressure drop, $\Delta P_d$, across the draft tube.

Prior art DTSFB apparatus require the determination of the split in mass flow between the draft tube, $F_d$, and the annulus, $F_a$. This data is typically obtained through experimentation on the specific apparatus used. For example, no general guidance or predictions of this flow split is available in the prior art literature. If $F_a$ is fixed or known, $F_d$ can be determined; but again, in the prior art, the pressure drop across the annulus, $\Delta P_a$, and the pressure drop across the draft tube, $\Delta P_d$, are typically the same. Aspects of the present invention are not limited by this restriction; that is, in aspects of the present invention, the pressure drop across the annulus, $\Delta P_a$, and the pressure drop across the draft tube, $\Delta P_d$, may, and typically will, be different. This distinction can provide enhanced operational versatility to aspects of the present invention compared to the prior art.

These limitations of prior art DTSFB apparatus are particularly acute when handling low-density particulate, such as aerogel beads. Specifically, when attempting to handle low-density particulate material in prior art DTSFB apparatus, the annulus pressure drop, $\Delta P_a$, will typically impose an undesirably high-pressure drop across the draft tube, $\Delta P_d$. Light, low-density particles typically do not require a high-pressure drop across the draft tube to transport the particles through the draft tube. As a result, should the operating regime of the prior art DTSFB apparatus impose a relatively higher pressure drop across the annulus, $\Delta P_a$, a comparable relatively higher pressure drop will also be imposed across the draft tube. Due to the low-density of the particles, such a higher pressure drop across the draft tube will propel a higher solids fraction through the draft tube, which typically may be undesirable, especially, in coating applications.

In contrast, according to aspects of the present invention, the pressure drop across the draft tube, $\Delta P_d$, and the pressure drop across the annulus, $\Delta P_a$, may be independent; that is, the pressure drop across the draft tube, $\Delta P_d$, may not be dictated by the annulus pressure drop, $\Delta P_a$. According to aspects of the invention, the pressure drop across the draft tube may be relatively low, for example, lower than the pressure drop across the annulus. For instance, when transporting low-density particulate material, for example, aerogel beads (having an density of about 140 kg/m³) that can be transported with a lower pressure drop across the draft tube, aspects of the present invention are far superior to prior art DTSFB apparatus.

Though theoretically, when handling low-density materials, such as aerogel beads, in a prior art DTSFB apparatus, the pressure drop across the draft tube may simply be reduced by lowering the pressure drop across the annulus, for example, by reducing the bed height in the annulus. However, the inventors have found that, though the pressure drop across the annulus can be reduced by reducing the bed height of the particulate material in the annulus, in practice, the desirable pressure drops across the draft tube for low-density materials require that the pressure drop across the annulus, and the bed height, may be markedly low. As a result, such low bed heights are difficult, if not impossible, to maintain in practically-designed DTSFB apparatus. Only by using aspects of the present invention, where the draft tube pressure drop may be independent of the annulus pressure drop, is the handling of low-density particulate material, such as, aerogel beads, practical or even possible. However, aspects of the invention may also be used to handle high-density particulate material, for example, glass beads.

The aspects of the invention illustrated in FIGS. 3 through 6 were used by the inventors to coat particulate material according to aspects of the invention. Prior to formal experimentation, as is typical, the inventors investigated the desirable sizes and operating parameters. The following investigation, experimentation, aspects of the invention are discussed with reference to the use of aerogel beads as the particulate material. However, the inventors recognize and it is to be understood that aspects of the invention may be applied to any particulate material, including but not limited to pharmaceuticals; food stuffs; cosmetics; metals, such as, powder manufacturing powder metals; ceramics; and like particulates.

The inventors' objective in performing the following investigation was to produce a coated aerogel bead and/or a coated aerogel bead material, for instance, a material that can be applied to a surface, for example, by spraying, or formed into a desired shape, for example, by molding. In one aspect, the coated aerogel bead and/or material may comprise an insulating material, for example, a thermal or electrical insulating material. In the following experiments, the aerogel beads used comprised 1 to 3 mm aerogel beads provided by Cabot Inc., though any similar or equivalent aerogel beads may be used in aspects of the invention.

According to one aspect and as described below, a method may be practiced using a DTSFB apparatus as described in FIGS. 1-6; however, the inventors recognize that aspects of the invention may also be practiced in other apparatus that are adapted to perform the methods recited. The DTSFB apparatus may be adapted to agitate and/or suspend the aerogel beads in a first fluid, for example, air, nitrogen, or an inert gas, among other gases, and then exposing the agitated and/or suspended aerogel to a second fluid, that is, the "coating fluid," containing at least one volatile component and at least one non-volatile component whereby when the volatile component are allowed to volatilize or evaporate at least some of the non-volatile component remains on the surface of the aerogel beads. In this discussion and in the description of aspects of the invention that and in the attached claims, a "non-volatile" component comprises a component of the liquid that is not volatile under the temperature and pressure conditions under which the process is performed, for example, at a temperature less than about 250 degrees C. (about 482 degrees F.) and a pressure less than 2 atmospheres. Conversely, a "volatile component" is one that does volatilize or evaporate under the temperature and pressure conditions under which the process is performed. For example, in the investigation described below, the second fluid comprises a fluid containing a non-volatile polymer and a volatile component, such as, water, alcohol, or a solvent, that is introduced to the beads as a spray or fine mist. According to one aspect of the invention, attrition, wear, or damage to the aerogel beads is minimized or prevented. In addition, according to one aspect of the invention, the volatile component of the second fluid volatilizes or evaporates quickly enough that substantially little or no penetration of the aerogel bead by the second fluid occurs.

In order to better understand the potential for penetration of the second fluids in to the aerogel beads, the inventors proposed the following relationships in Equations 3 and 4.

$$\frac{\Delta P}{\Delta x} = \frac{P_{atm} - (\gamma/r_o)}{L_{pore}} \quad \text{[Equation 3]}$$

and $$v_{avg} = -(\Delta P/\Delta x) r_o^2 / (8\mu) \quad \text{[Equation 4]}$$

where $\Delta P/\Delta x$ is the driving pressure drop radially into the pores of the aerogel bead, $N/m^3$;

$P_{atm}$ is the prevailing atmospheric pressure, assumed 101,000 $N/m^2$;

$\gamma$ is the surface tension of the second fluid, assumed $26.9 \times 10^{-3}$ $J/m^2$;

$r_o$ is the radius of the aerogel beads, assumed 10 nanometers [nm];

$L_{pore}$ is the length the pore in the surface of the bead, assumed 1 micrometer [µm];

$v_{avg}$ is the average velocity of the second fluid through the pores of the aerogel beads, mm/s; and $\mu$ is the viscosity of the second fluid, assumed 1 $N{-}s/m^2$.

By evaluating Equations 3 and 4 with the assumed values, the following parameters were estimated for the processing of aerogel beads.

$$\frac{\Delta P}{\Delta x} = -2.7 \times 10^{11} \text{ N/m}^3$$

and $$v_{avg} = 3.3 \times 10^{-3} \text{ mm/s}.$$

The resulting design specifications for the experiments performed are listed in Table 1 and the resulting design calculation parameters appear in Table 2.

TABLE 1

| | DTSFB Apparatus Aerogel Coating Design Specifications | | |
|---|---|---|---|
| Fluid, particle, and bed properties | Particle Density ($\rho_g$) | 140 | kg/m³ |
| | Air Density ($\rho_f$), at 298 K | 1.165 | kg/m³ |
| | Air Viscosity ($\mu_f$) at 298 K | $18.64 \times 10^{-6}$ | Ns/m² |
| | Annulus Voidage ($\epsilon_a$) | 0.42 | |
| Geometric Properties | Particle diameter ($d_p$) | 1 | mm |
| | Draft tube diameter ($D_d$) | 41.15 | mm |
| | Draft tube length ($l_d$) | 2 | m |
| | Annulus inner diameter ($D_i$) | 44.45 | mm |
| | Annulus Outer diameter ($D_o$) | 149.1 | mm |
| | Height of particles in annulus ($H_a$) | 0.5 | m |
| Inlet flow rates | Jet and Auxiliary flow ($F_{jo} + F_{axo}$) | 866 | liters/min. |
| | Spray flow ($F_s$) | 34 | liters/min. |
| | Total flow | 900 | liters/min. |
| Draft tube conditions | Superficial air velocity ($U_d$) | 10 | m/s |
| | Solids fraction ($1-\epsilon_d$) | 0.01 | |

TABLE 2

DTSFB Apparatus Aerogel Coating Design Calculation Results

| | |
|---|---|
| Draft tube pressure drop ($\Delta P_d$) | 96.2 Pa (0.386 in. of $H_2O$) |
| Annulus pressure drop ($\Delta P_a$) | 236.6 Pa (1.07 in. of $H_2O$) |
| Particle flux ($W_d$) | 12.6 kg/m²s |
| Particle Mass Flow ($G_d$) | 0.0167 kg/s |
| Minimum Fluidizing Velocity ($U_{mf}$) | 0.043 m/s |
| Slip Velocity ($U_a + v_a$) | 0.042 m/s |
| Terminal Velocity ($U_T$) | 1.133 m/s |
| Superficial air velocity ($U_d$) | 10 m/s |

According to aspects of the invention, apparatus 100 shown in FIGS. 3 through 6, was operated under the conditions listed in Tables 1 and 2. In addition the spray nozzle 140 shown in FIG. 6 was operated under the conditions that appear in Table 3. In these experiments, spray nozzle 140 comprised a SU2A atomizing spray nozzle system provided by Spraying Systems Company, though in aspects of the invention any similar or equivalent commercially available spraying system may be used.

TABLE 3

DTSFB Apparatus Aerogel Coating Spray Nozzle Parameters

| | |
|---|---|
| Nozzle orifice diameter | 0.020 inches |
| Air Pressure | 4-60 psig |
| Air Capacity | 0.8-2.7 scfm |
| Liquid pressure | 3-40 psi |
| Liquid capacity | 2-284 ml/min. |
| Spray time | <10 mins. |

The aerogel beads were provided to vessel 112 in system 102 from a bead source (not shown) by means of a bead hopper (not shown) having a pneumatic injector, though other types of transfer systems may be used. The transport fluid in system 102, that is, the fluid introduced to inlets 144 and 130 (that is, $F_{jo}+F_{axo}$), comprised ambient air heated to about 50 degrees C. and introduced at the rate that appears in Table 1. The transport fluid may range in temperature from about 10 degrees C. to about 150 degrees C., for example, from 30 degrees C. to about 100 degrees C. In one aspect, vessel 112 may also be heated, for example, by means of a thermal blanket or by means of a heat exchanger through which a heated fluid, for example, air or water, may be passed. The walls of vessel 112 may be heated to about 10 degrees C. to about 150 degrees C., for example, from 30 degrees C. to about 100 degrees C. In these experiments, the walls of vessel 12 were heated to about 40 degrees C.

The coating fluid in system 102, that is, the fluid introduced to inlets 140 (that is, F) comprised one of fluids listed in Table 4. The coating fluid may be heated, for example, to a temperature ranging from about 10 degrees C. to about 250 degrees C., for example, from 30 degrees C. to about 100 degrees C.

TABLE 4

DTSFB Apparatus Aerogel Coating Fluids

Colorcon OPADRY II polyvinyl alcohol, water-based cationic polymer
Eudragit[1] L30 D55 polymethyl methacrylate, water-based anionic polymer
Eudragit[1] E12,5 polymethyl methacrylate, solvent-based cationic polymer
Eudragit[1] NE30 D polymethyl methacrylate, solvent-based neutral polymer
Eudragit[1] RL 12,5 polymethyl methacrylate, solvent-based cationic polymer
Water-borne polyurethane solution

[1] Eudragit solutions can be mixed with virtually any solvent to control viscosity, surface tension, etc., as needed.

During processing, the aerogel beads in vessel 112 are agitated, aerated, and transported into the open end 122 of conduit 120. At substantially the same time as this agitation and transport, a coating fluid is introduced by means of spray nozzle 140 to the vicinity of the open end 122 whereby at least some of the aerogel beads are exposed to the coating fluid. The coated beads are then transported through conduit, or draft tube, 120 to vessel 212 in apparatus 104 and discharged from open end 124 of conduit 120. According to the aspects of the present invention, the at least partially coated aerogel beads that are discharged from open end 124 may typically settle to the bottom of vessel 212, for example, in the off-set conical bottom of vessel 212. In one aspect, the at least partially coated beads may then be forwarded to further processing, or returned to apparatus 102 for further coating, for example, via conduit 222 and inlet 133 in top 114 of vessel 112. For example, in one aspect, the aerogel beads may be treated, that is, coated, in apparatus 102 repeatedly, for example, at least twice, but may be recycled from apparatus 104 to apparatus 102 three or more, or four or more times, depending upon, among other things, the size of the particles being coated and the amount or extent of coating desired.

While the coated aerogel beads may be recirculated to apparatus 102, the fluid stream introduced to vessel 212 via conduit 120 may be discharged from vessel 212, for example, from one or more outlets 220, and forwarded to re-use as a transfer medium or for further processing. For example, the fluid, typically, gaseous, stream discharged from vessel 212 may be treated to remove any aerogel beads or other particulate. For instance, the fluid stream discharged from vessel 212 may be scrubbed or filtered, for example, filtered in a conventional "bag-house" filter or other filtering medium (not shown), prior to being further processed or re-used.

Figure 7:
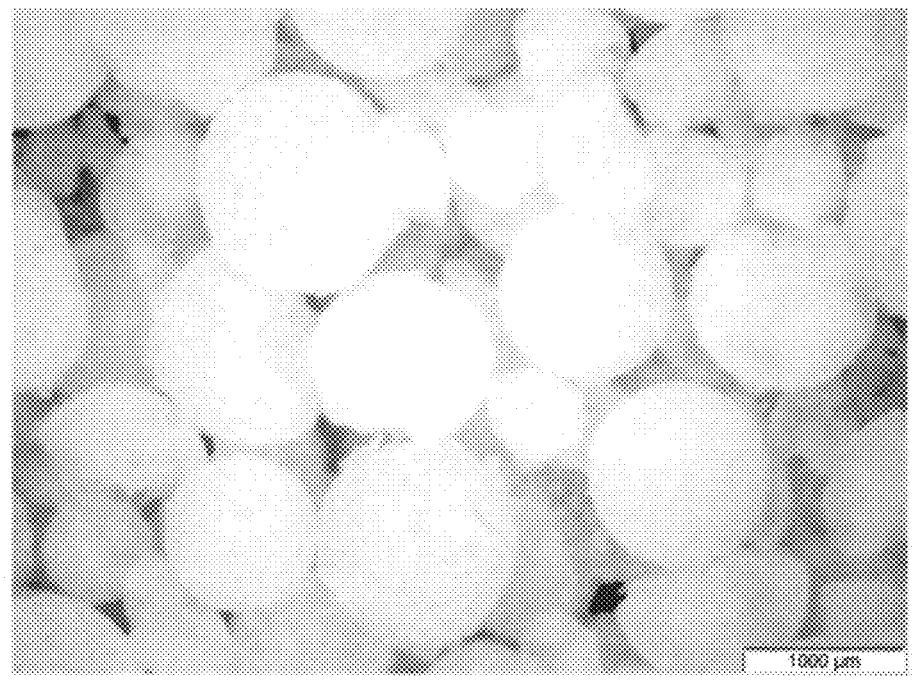
FIG. 7 is a photograph of magnified aerogel particles as treated according to aspects of the invention.
Figure 8:
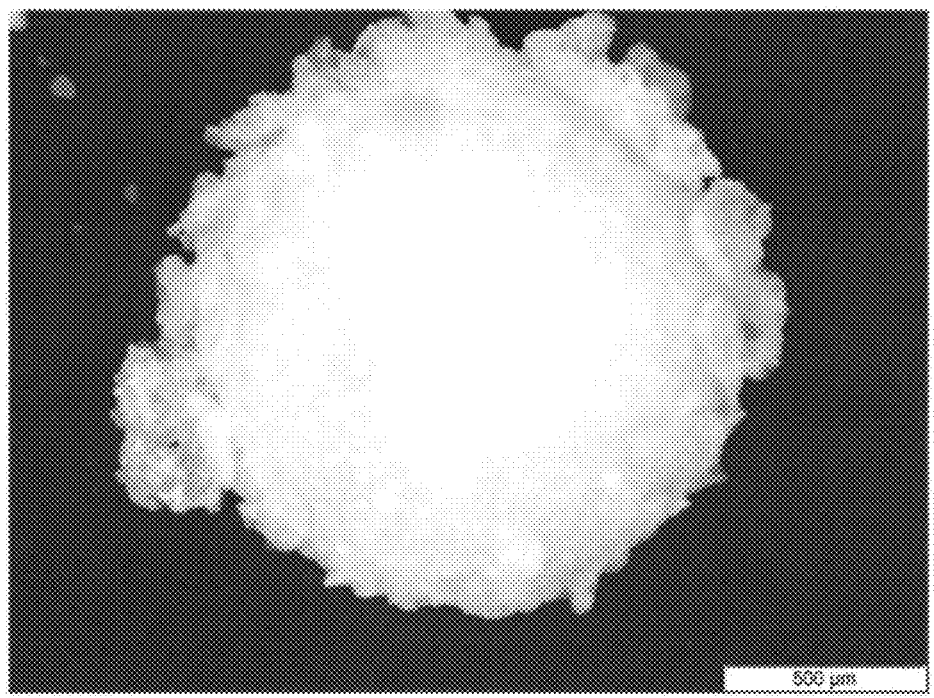
FIG. 8 is a photograph of a magnified aerogel particle as treated according to aspects of the invention.

FIGS. 7 through 10 illustrate typical coated aerogel beads produced with the apparatus 100 shown in FIGS. 3 through 6 according to one aspect of the invention. FIG. 7 illustrates a magnified view of aerogel beads coated in a first trial according to aspects of the invention as magnified 20 times. FIG. 8 illustrates a magnified view of one coated aerogel bead produced in the same trial as the beads shown in FIG. 7 when magnified 50 times. In this first trial, the aerogel beads were coated with a pharmaceutical grade polyvinyl alcohol, specifically, Opradry II polyvinyl alcohol. The beads were coated for a total processing time of about 1 minute at a temperature of about 90 degrees C. The results of this trial produced coated beads with substantially no penetration of the coating fluid into the beads and minimal bead attrition due to processing.

Figure 9:
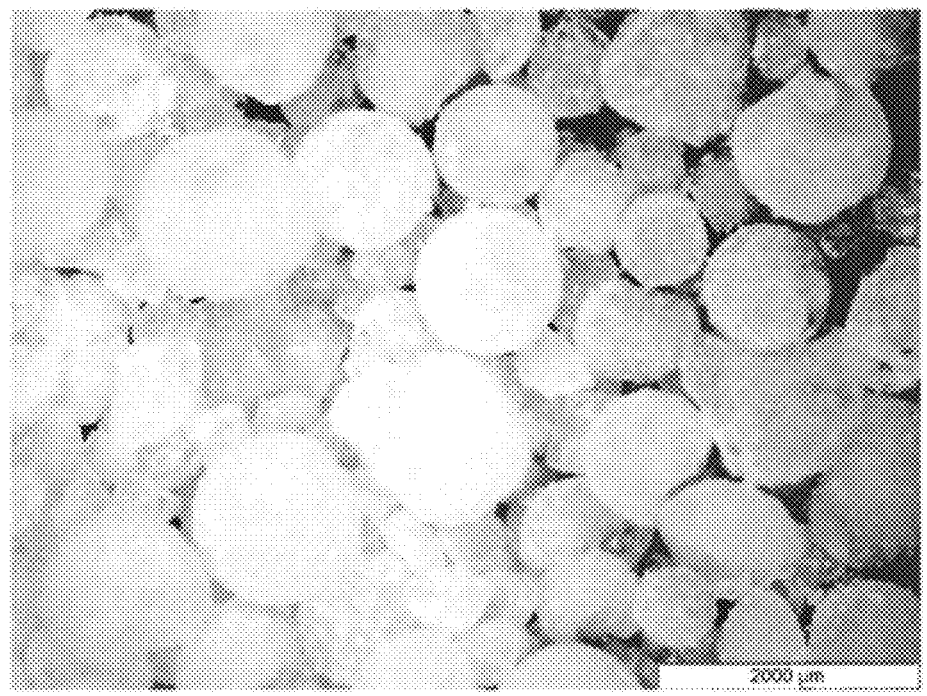
FIG. 9 is a photograph of further magnified aerogel particles as treated according to aspects of the invention.
Figure 10:
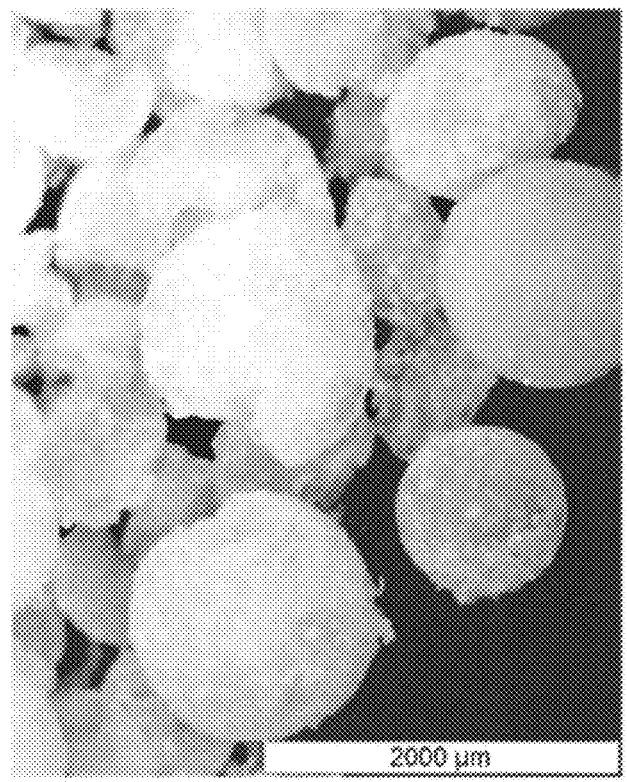
FIG. 10 is a photograph of further magnified aerogel particles as treated according to aspects of the invention.

FIG. 9 illustrates a magnified view of aerogel beads coated in a second trial according to aspects of the invention as magnified 20 times. FIG. 10 illustrates a magnified view of coated aerogel beads produced from the same second trial as FIG. 9 when magnified 50 times. In this second trial, the aerogel beads were again coated with a pharmaceutical grade polyvinyl alcohol, specifically, Surelease brand polyvinyl alcohol. The beads were coated for a total processing time of about 10-20 minutes at a temperature of about 90 degrees C. The results of this second trial produced coated beads with substantially no penetration of the coating fluid into the beads, minimal bead attrition due to processing, and more compete, smoother coverage of the bead surface than produced from the first trial. Some difficulties with the spraying nozzle were encountered in the second trial, which may have impacted the uniformity of the particle coating. The inventors believe that improved control of the temperature of the sprayed coating will likely overcome this difficulty.

Examination of the coated aerogel particles shown in the photographs of FIGS. 8 and 10 clearly illustrate the presence of coating material on the surface of the aerogel particles. Though these photographs illustrate the partial coating of the surface of the aerogel particles, even this particle coating provides particles having enhanced properties. However, according to aspects of the invention, the extent of the coverage or coating of aerogel particles can be enhanced by, among other things, repeated exposure to the coating fluid, for example, by recycling of the particles for repeat treatment in apparatus 100, or optimization of the operating parameters of the treatment, for example, varying the temperature or rate of flow of the coating fluid. These and other modifications of aspects of the present invention are included within the scope of aspects of the invention.

In any event, the first and second coating trials with apparatus 100 illustrated in FIGS. 3 through 6, clearly illustrate the effectiveness of aspects of the present invention when coating aerogel beads to produce an aerogel-based material, for example, an insulation material. The coated beads exhibit little or no penetration of the coating fluid into the beads while subjecting the beads to little or no wear or attrition, thus ensuring the integrity of the beads, especially, their insulating properties. The inventors are optimistic that apparatus 100 can be an effective device for coating other types of particulate material, for example, other types of low-density particulate material, that can, for example, provide the designer a novel material for any application where thermal or electrical insulation is desired.

While several aspects of the present invention have been described and depicted herein, alternative aspects may be provided by those skilled in the art to accomplish the same objectives. Accordingly, it is intended by the appended claims to cover all such alternative aspects as fall within the true spirit and scope of the invention.

The invention claimed is:

1. A coated particulate material consisting of a plurality of separate individual aerogel beads, each bead having a surface at least partially covered with a polymer coating, the polymer coating comprising a surface adhering non-volatile residual portion of a dried bead coating fluid received on the surface.

2. The coated particulate material as recited in claim 1 wherein the aerogel beads comprise about 1 mm to about 5 mm aerogel beads.

3. The coated particulate material as recited in claim 1 wherein the polymer comprises at least one of a polyvinyl alcohol, a polymethyl methacrylate, and a polyurethane.

4. An insulating material comprising a plurality of separate individual aerogel beads, each bead having a surface at least partially covered with a polymer coating, the polymer coating comprising a surface adhering non-volatile residual portion of a dried bead coating fluid received on the surface.

5. The insulating material as recited in claim 4 wherein the aerogel beads comprise about 50 micrometer to about 5 millimeter aerogel beads.

6. The insulating material as recited in claim 4 wherein the polymer comprises at least one of a polyvinyl alcohol and a polyurethane.

7. The coated particulate material as recited in claim 1, wherein at least 75% of the surface of each bead is covered with the polymer coating.

8. The coated particulate material as recited in claim 1, wherein at least 90% of the surface of each bead is covered with the polymer coating.

9. The insulating material as recited in claim 4, wherein at least 75% of the surface of each bead is covered with the polymer coating.

10. The insulating material as recited in claim 4, wherein at least 90% of the surface of each bead is covered with the polymer coating.

* * * * *